United States Patent
Li et al.

(10) Patent No.: US 9,602,319 B2
(45) Date of Patent: Mar. 21, 2017

(54) APPARATUS, METHOD, AND COMPUTER READABLE MEDIUM FOR HIGH-EFFICIENCY WIRELESS LOCAL-AREA NETWORK (HEW) SIGNAL FIELD DETECTION

(71) Applicant: Intel IP Corporation, Santa Clara, CA (US)

(72) Inventors: Qinghua Li, San Ramon, CA (US); Xiaogang Chen, Beijing (CN); Yuan Zhu, Beijing (CN); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 31 days.

(21) Appl. No.: 14/573,223

(22) Filed: Dec. 17, 2014

(65) Prior Publication Data
US 2016/0037441 A1 Feb. 4, 2016

Related U.S. Application Data

(60) Provisional application No. 62/032,954, filed on Aug. 4, 2014.

(51) Int. Cl.
*H04L 1/00* (2006.01)
*H04L 27/26* (2006.01)
(Continued)

(52) U.S. Cl.
CPC ........ *H04L 27/2602* (2013.01); *H04L 1/0001* (2013.01); *H04L 27/2613* (2013.01);
(Continued)

(58) Field of Classification Search
CPC . H04L 69/323; H04L 5/0007; H04L 27/2613; H04W 28/065
(Continued)

(56) References Cited

U.S. PATENT DOCUMENTS

| 2010/0054368 A1 | 3/2010 | Feng |
| 2011/0110348 A1 | 5/2011 | Lee et al. |

(Continued)

FOREIGN PATENT DOCUMENTS

| TW | 201608858 A | 3/2016 |
| WO | WO-2011019968 A1 | 2/2011 |

(Continued)

OTHER PUBLICATIONS

"International Application Serial No. PCT/US2015/034880, International Search Report mailed Sep. 18, 2015", 3 pgs.

(Continued)

*Primary Examiner* — Dady Chery
(74) *Attorney, Agent, or Firm* — Schwegman Lundberg & Woessner, P.A.

(57) ABSTRACT

Apparatuses, methods, and computer readable media are disclosed. A STA to detect a HE SIG may be configured to detect the HE SIG based on at least one from the following group: a flipped reserved bit, a scrambled portion of the HE SIG, and a rotation of a signal constellation of the HE SIG different than legacy rotations of: a rotation of a first signal constellation and no rotation of a second signal constellation, and no rotation of the first signal constellation and a rotation of the second signal constellation. The STA may determine that a reserved bit is the flipped reserved bit based on a bit being reversed from a legacy standard. The STA may unscramble a received signal field, determine whether a CRC indicates the HE-SIG contains errors, and if the CRC indicates there are no errors, then determine that the signal field is the HE SIG.

21 Claims, 9 Drawing Sheets

(51) Int. Cl.
*H04L 27/34* (2006.01)
*H04L 25/03* (2006.01)

(52) U.S. Cl.
CPC ........ *H04L 27/3444* (2013.01); *H04L 1/0061* (2013.01); *H04L 25/03866* (2013.01)

(58) Field of Classification Search
USPC ........................................ 370/338, 229, 230
See application file for complete search history.

(56) References Cited

U.S. PATENT DOCUMENTS

2011/0149927 A1    6/2011  Stacey et al.
2014/0328249 A1* 11/2014  Vermani ............. H04W 28/065
                                                          370/328

FOREIGN PATENT DOCUMENTS

WO    WO-2013063574 A1    5/2013
WO    WO-2016022208 A1    2/2016

OTHER PUBLICATIONS

"International Application Serial No. PCT/US2015/034880, Written Opinion mailed Sep. 18, 2015", 8 pgs.
"Taiwanese Application Serial No. 104121303, Office Action mailed Aug. 2, 2016", W? English Search Report, 10 pgs.

* cited by examiner

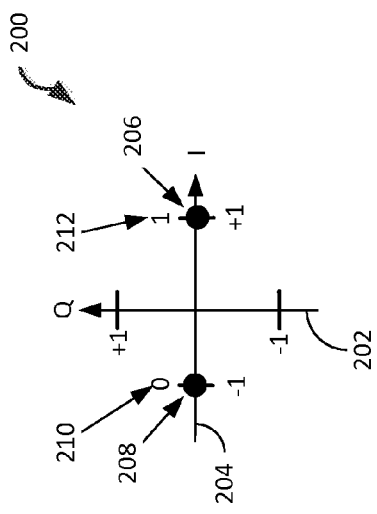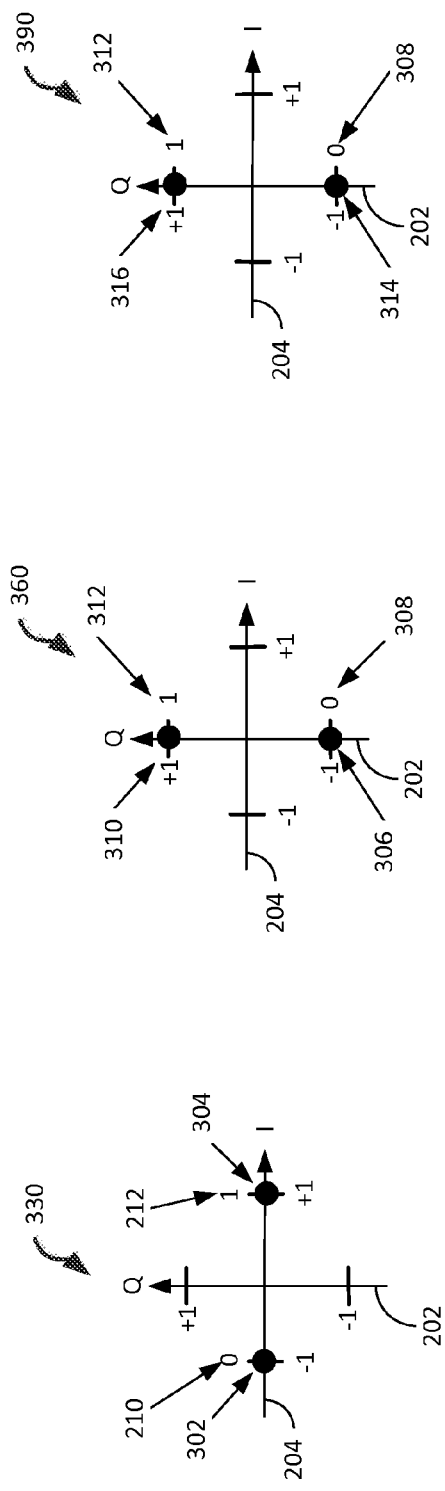
FIG. 2
FIG. 3

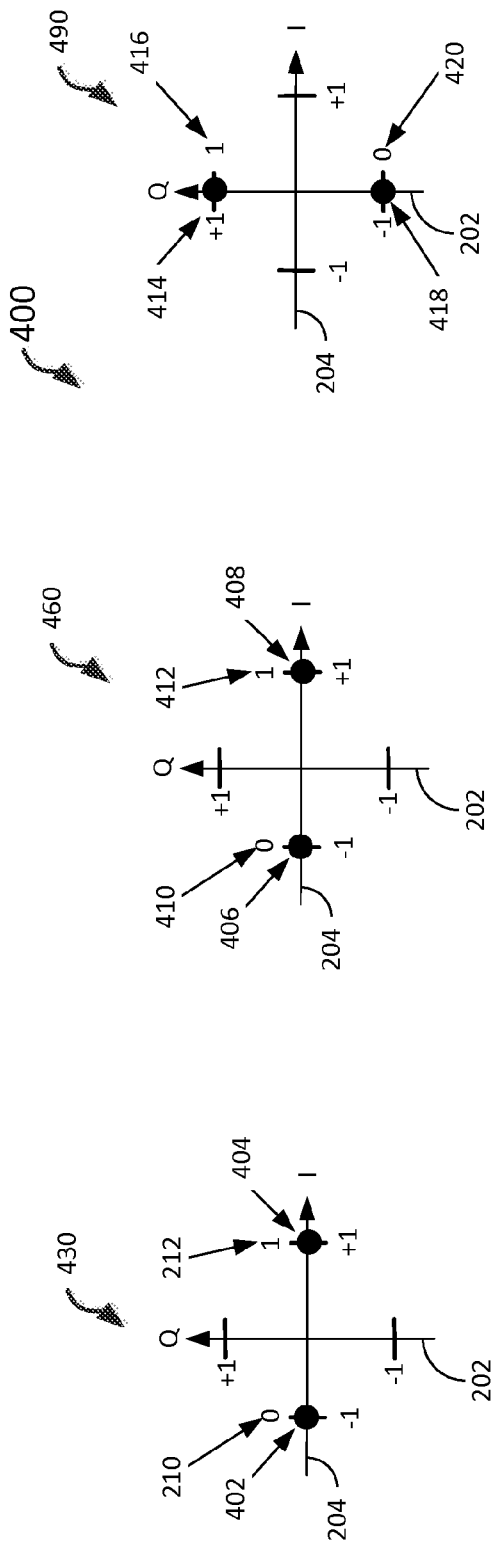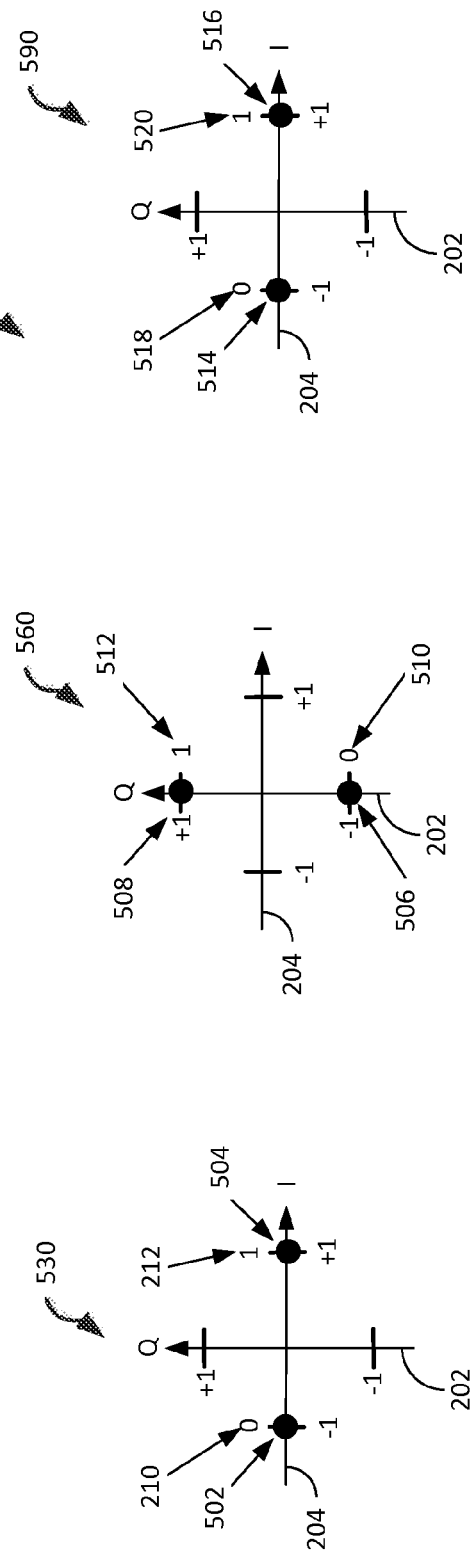
FIG. 4
FIG. 5

APPARATUS, METHOD, AND COMPUTER READABLE MEDIUM FOR HIGH-EFFICIENCY WIRELESS LOCAL-AREA NETWORK (HEW) SIGNAL FIELD DETECTION

PRIORITY CLAIM

This application claims the benefit of priority under 35 USC 119(e) to U.S. Provisional Patent Application Ser. No. 62/032,954, filed Aug. 4, 2014, which is incorporated herein by reference in its entirety.

TECHNICAL FIELD

Embodiments pertain to wireless networks. Some embodiments pertain to detecting high-efficiency (HE) signal fields (SIGs) in wireless local-area networks (WLANs) by high-efficiency wireless local-area networks (HEW) devices.

BACKGROUND

Signal fields are often used to indicate a data rate and length of the data, as well as other information. There are different types of signal fields that may correspond to different standards. A device may need to determine which standard a signal field is configured for in order to properly interpret the signal field.

Moreover, often more than one standard may be in use in a wireless local-area network (WLAN). For example, Institute of Electronic and Electrical Engineers (IEEE) 802.11ax, referred to as high efficiency wireless local-area networks (WLAN) (HEW) may need to be used with legacy versions of 802.11.

Thus, there are general needs for methods, apparatuses, and computer readable media for detecting for which standard a signal field is configured.

BRIEF DESCRIPTION OF THE DRAWINGS

The present disclosure is illustrated by way of example and not limitation in the figures of the accompanying drawings, in which like references indicate similar elements and in which:

FIG. 2 illustrates a signal constellation that may be used in a signal field to indicate that packets that follow may be for 802.11a, in accordance with some embodiments;

FIG. 3 illustrates a series of signal constellations that may be used in a signal field to indicate that packets that follow may be for 802.11n, in accordance with some embodiments;

FIG. 4 illustrates a series of signal constellations that may be used in a signal field to indicate that packets that follow may be for 802.11ac, in accordance with some embodiments;

FIG. 5 illustrates a series of signal constellations that may be used in a signal field to indicate that packets that follow may be for 802.11ax in accordance with some example embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
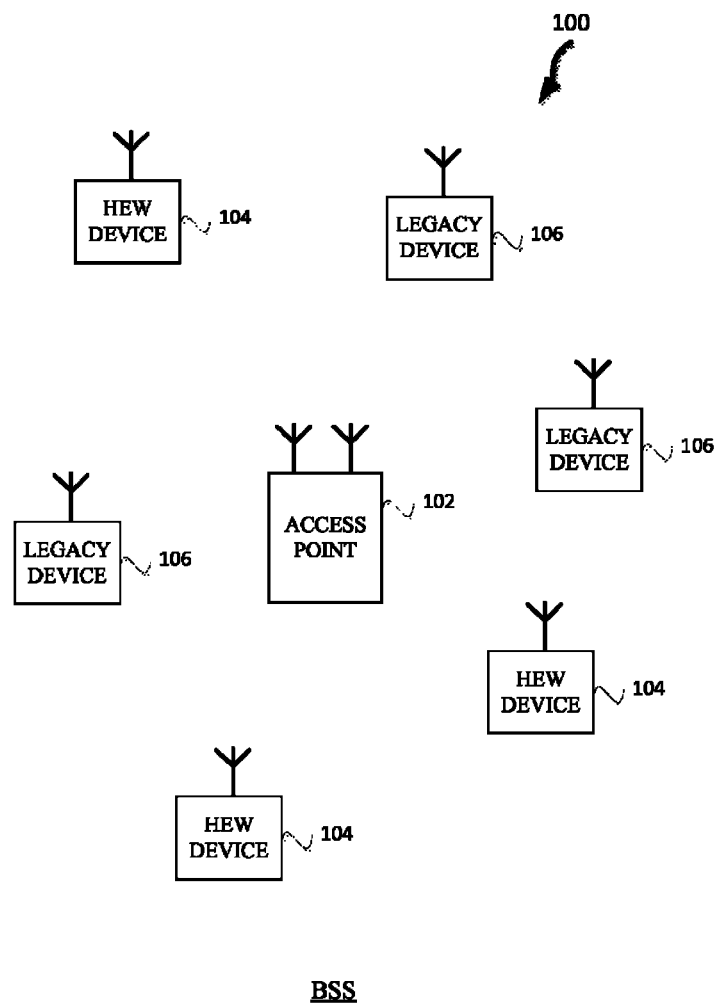
FIG. 1 illustrates a wireless network, in accordance with some embodiments.

FIG. 1 illustrates a wireless network, in accordance with some embodiments. The wireless network may comprise a basic service set (BSS) 100 that may include an access point (AP) 102, a plurality of HEW devices 104, and a plurality of legacy devices 106.

The AP 102 may be an access point (AP) using the Institute of Electrical and Electronics Engineers (IEEE) 802.11 to transmit and receive. The AP 102 may be a base station. The AP 102 may use other communications protocols as well as the 802.11 protocol as described below. The 802.11 protocol may be 802.11ax. The 802.11 protocol may include using OFDMA. The 802.11 protocol may include using multi-user (MU) multiple-input and multiple-output (MIMO)(MU-MIMO), space division multiplexing (SDM), and/or space division multiple access (SDMA). The HEW devices 104 may operate in accordance with 802.11ax and/or DensiFi. The legacy devices 106 may operate in accordance with one or more of 802.11 a/g/ag/n/ac, or another legacy wireless communication standard.

The HEW devices 104 may be wireless transmit and receive devices such as cellular telephones, handheld wireless devices, wireless glasses, wireless watches, wireless personal devices, tablets, or other devices that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques.

Legacy IEEE 802.11 communication techniques may refer to any IEEE 802.11 communication technique prior to IEEE 802.11ax.

In some embodiments, a HEW frame may be configurable to have the same bandwidth, and the bandwidth may be one of 20 MHz, 40 MHz, 80 MHz, or 160 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

In other embodiments, the AP 102, HEW device 104, and/or legacy device 106 may implement additional or different technologies such as code division multiple-access (CDMA)2000, CDMA2000 1X, CDMA2000 EV-DO, Interim Standard 2000 (IS-2000), Interim Standard 95 (IS-95), Interim Standard 856 (IS-856), Global System for Mobile communications (GSM), Long-Term Evolution (LTE), a standard from the 3 Generation Partnership Project (3GPP), Enhanced Data rates for GSM Evolution (EDGE), GSM EDGE (GERAN), IEEE 802.16 (i.e., Worldwide Interoperability for Microwave Access (WiMAX)), WiFi®, BlueTooth®, BlueTooth® Low Energy (BLE), 802.15.4, neighbor aware networking (NAN) program, near-field communication (NFC), and/or a wireless personal area network (WPAN) wireless technology.

In an OFDMA system such as 802.11ax, an associated HEW device 104 may operate on any 20 MHz sub-channel of the BSS 100 (that can operate, for example, at 80 MHz). In example embodiments, an AP 102, HEW devices 104, and legacy devices 106 use carrier sense multiple access/collision avoidance (CSMA/CA). In some embodiments, the media access control (MAC) layer 1206 (see FIG. 12) controls access to the wireless media.

In example embodiments, an AP 102, HEW devices 104, and legacy devices 106 perform carrier sensing and can detect whether or not the channel is free. For example, an AP 102, HEW device 104, or legacy device 106 may use clear channel assessment (CCA), which may include a determination as to whether the channel is clear based on a Decibel-milliwatts (dBm) level of reception. In example embodiments, the physical layer (PHY) 1204 is configured to determine a CCA for an AP 102, HEW devices 104, and legacy devices 106.

After determining that the channel is free, an AP 102, HEW device 104, and legacy devices 106 defer their attempt to access the channel during a back-off period to avoid collisions. In example embodiments, an AP 102, HEW device 104, and legacy devices 106 determine the back-off period by first waiting a specific period of time and then adding a random back-off time, which, in some embodiments, is chosen uniformly between 0 and a current contention window (CS) size. A period of time may also be called a duration.

In example embodiments, an AP 102, HEW devices 104, legacy devices 106, access the channel in different ways. For example, in accordance with some IEEE 802.11ax embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional Wi-Fi communications in which legacy devices 106 and, optionally, HEW devices 104 communicate in accordance with a contention-based communication technique, rather than a non-contention multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a SDMA technique or uplink MU-MIMO (UL MU-MMIO).

The AP 102 may also communicate with legacy devices 106 in accordance with legacy IEEE 802.11 communication techniques. In some embodiments, the master station, which may be the AP 102, may also be configured to communicate with HEW stations outside the HEW control period in accordance with legacy IEEE 802.11 communication techniques, although this is not a requirement.

In example embodiments, the AP 102 is configured to perform one or more of the functions and/or methods described herein in conjunction with FIGS. 2 through 10 such as detecting a HE-SIG based on at least one from the following group: a rotation of the signal constellation of the SIG, a reserved bit, and a scrambled portion of the HE-SIG.

FIG. 2 illustrates a signal constellation 200 that may be used in a signal field to indicate that packets that follow may be for 802.11a, in accordance with some embodiments. The horizontal axis may be an in-phase (I) 204 portion of a received signal field and the vertical axis may be a quadrature portion (Q) 202 portion of the received signal field. The amplitude and phase shift of the received signal field encode information. The dots 206, 208 indicate received amplitude and phase combinations of symbols 0 210 and 1 212, respectively. The power can be measured along the I axis 204 and along the Q axis 202. A greater power along the I axis 204 may indicate that the signal field is for 802.11a.

HEW devices 104 may use the signal constellation 200 to determine the I 204 and Q 202 axes, although the scope of the embodiments is not limited in this respect. HEW devices 104 may use the signal constellation 200 to determine that a packet is an 802.11a packet and defer use of the wireless medium based on a length and duration in the 802.11a packet, although the scope of the embodiments is not limited in this respect. HEW devices 104 may determine to use the 802.11a standard based on receiving the signal constellation 200, although the scope of the embodiments is not limited in this respect.

FIG. 3 illustrates a series 300 of signal constellations 330, 360, 390 that may be used in a signal field to indicate that packets that follow may be for 802.11n, in accordance with some embodiments. The signal constellations 330, 360, 390 may be similar to the signal constellation 200 in FIG. 2. In the first signal constellation 330, the dots 302, 304 are along the I axis 204. In the second signal constellation 360, the dots 306, 310 indicate received amplitude and phase combinations of symbols 0 308, and 1 312, respectively. The dots 306, 310 are along the vertical (Q) axis 202. In the third signal constellation 390, the dots 314, 316 indicate received amplitude and phase combinations of symbols 0 308, and 1

312. The dots 314, 316 are along the vertical axis 202. The power can be measured along the I axes 204 and along the Q axes 202. The first constellation 330 may be used to determine the I axis 204 and the Q axis 202. A greater power on the Q axis 202 for the second constellation 360, and a greater power on the Q axis 202 for the third constellation 390 may indicate that the signal fields may be for 802.11n. The first constellation 330 may be a signal field. The second and third constellations 360, 390 may be high-throughput (HT) signal fields.

HEW devices 104 may use the signal constellations 330, 360, and/or 390 to determine that a packet is an 802.11n packet and defer use of the wireless medium based on a duration and length in the 802.11n packet, although the scope of the embodiments is not limited in this respect. HEW devices 104 may determine to use the 802.11n standard based on receiving the signal constellations 330, 360, 390, although the scope of the embodiments is not limited in this respect.

FIG. 4 illustrates a series 400 of signal constellations 430, 460, 490 that may be used in a signal field to indicate that packets that follow may be for 802.11ac, in accordance with some embodiments. The signal constellations 430, 460, 490 may be similar to the signal constellation 200 in FIG. 2. In the first signal constellation 430, the dots 402, 404 are along the I axis 204. In the second signal constellation 460, the dots 406, 408 indicate received amplitude and phase combinations of symbols 0 410 and 1 412, respectively, and the dots 406, 408 are along the I axis 204. In the third signal constellation 490, the dots 418, 414 indicate received amplitude and phase combinations of symbols 0 420 and 1 416, respectively, and the dots 414, 418 are along the Q axis 202. The power can be measured along the I axes 204 and along the Q axes 202. The first constellation 430 may be used to determine the I axis 204 and the Q axis 202. A greater power on the I axis 204 for the second constellation 460, and a greater power on the Q axis 202 for the third constellation 490 may indicate that the signal fields may be for 802.11ac. The first constellation 430 may be a signal field. The second and third constellations 460, 490 may be very-high-throughput (HT) signal fields, which may be termed SIG-A and SIG-B.

HEW devices 104 may use the signal constellations 430, 460, and/or 490 to determine that a packet is an 802.11ac packet and defer use of the wireless medium based on a duration and length in the 802.11ac packet, although the scope of the embodiments is not limited in this respect. HEW devices 104 may determine to use the 802.11ac standard based on receiving the signal constellations 430, 460, 490, although the scope of the embodiments is not limited in this respect.

FIG. 5 illustrates a series 500 of signal constellations 530, 560, 590 that may be used in a signal field to indicate that packets that follow may be for 802.11ax. The signal constellations 530, 560, 590 may be similar to the signal constellation 200 in FIG. 2. In the first signal constellation 530, the dots 502, 504 are along the I axis 204. In the second signal constellation 560, the dots 506, 508 indicate transmitted amplitude and phase combinations of symbols 0 510 and 1 512, respectively, and the dots 506, 508 are along the Q axis 202. The binary phase shift keying (BPSK) or Q-BPSK constellation is used by the transmitter. The received signal constellation 560 may be corrupted by the channel with different phase and magnitude. In the third signal constellation 590, the dots 514, 516 indicate received amplitude and phase combinations of symbols 0 518 and 1 520, respectively, and the dots 514, 516 are along the I axis 204. The power can be measured along the I axes 204 and along the Q axes 202. The first constellation 530 may be used to determine the I axis 204 and the Q axis 202. A greater power on the Q axis 204 for the second constellation 560, and a greater power on the I axis 204 for the third constellation 590 may indicate that the signal fields may be for 802.11ax. The first constellation 530 may be a signal field. The second and third constellations 560, 590 may be HE SIGs that may be for 802.11ax.

Figure 6:
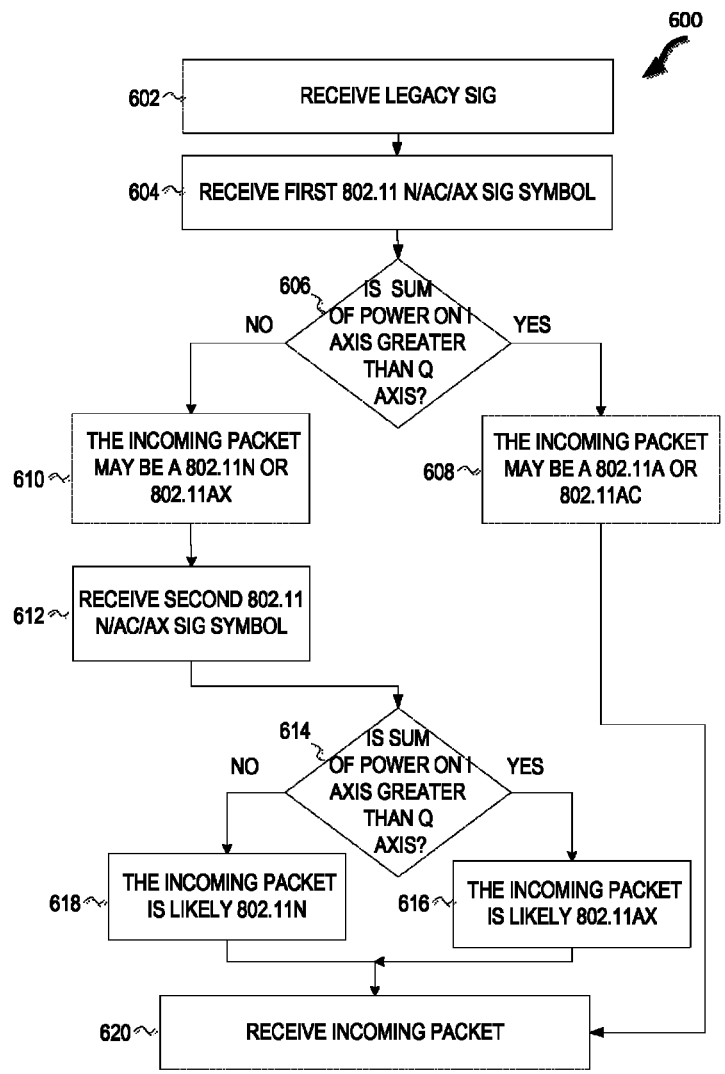
FIG. 6 illustrates a method for 802.11ax signal field detection, according to example embodiments.

FIG. 6 illustrates a method 600 for 802.11ax signal field detection, according to example embodiments. The method 600 may begin at operation 602 with receiving a legacy signal field. For example, the HEW device 104 (see FIG. 1) may receive a signal field with a constellation 200, 330, 430, 530 as illustrated in FIGS. 2, 3, 4, and 5, respectively. The method 600 may continue at operation 604 with receiving a first 802.11 n/ac/ax signal symbol. For example, the HEW device 104 may receive a first signal symbol that may have a constellation of 360 (FIG. 3), 460 (FIG. 4), or 560 (FIG. 5).

The method 600 continues at operation 606 by determining whether the sum of power on the I axis 204 is greater than the sum of power on Q axis. If the sum of the power on I axis 204 is greater than the Q axis, then the method 600 continues at operation 608 with the incoming packet likely being 802.11a or 802.11ac. For example, the constellation 460 (FIG. 4) may be from a signal field that is generated for the 802.11a or 802.11ac standard. The method 600 may continue at operation 620 with receiving the incoming packet. For example, the HEW device 104 may determine which standard is appropriate: the 802.11a or 802.11ac, and receive the subsequent packet(s) in accordance with the applicable standard.

Returning to operation 606, if the sum of power on the I axis 204 is not greater than the sum of power on the Q axis, then the method 600 may continue at operation 610 with the incoming packet likely being an 802.11n or 802.11ax packet. For example, constellation 360 (FIG. 3) and constellation 560 have a sum of power on the Q axis 202 greater than the sum of power on the I axis 204.

The method 600 continues at operation 612 with receiving a second 802.11 signal field symbol. For example, the HEW device 104 may receive a signal field that corresponds to constellation 390 (FIG. 3) or 590 (FIG. 5).

The method 600 continues at operation 614 by determining whether the sum of power on the I axis 204 is greater than the sum of power on the Q axis. If so, the method 600 continues at operation 616 with the incoming packet likely to be 802.11ax. For example, constellation 590 of FIG. 5 may be from a signal field that indicates that the incoming packet is in accordance with 802.11ax. The method 600 continues at operation 620 by receiving an incoming packet in accordance with 802.11ax.

Referring back to operation 614, if the sum of power on the I axis 204 is not greater than the sum of power on the Q axis, then the method 600 continues at operation 618 with the incoming packet likely to be an 802.11n packet. For example, constellation 390 of FIG. 3 may be from a signal field that indicates that the incoming packet is in accordance with 802.11n. The method 600 continues at operation 620 with receiving an incoming packet in accordance with 802.11n.

Optionally, the method 600 may continue with determining whether or not the packet is the determined standard. If the packet is not the determined standard, then the method 600 may determine to ignore the incoming packet. In example embodiments, additional types of SIGs may be received so that 802.11 n/ac/ax may include additional signal fields.

The method 600 may enable a HEW device 104 to more reliably identify a 802.11ax packet by focusing the voltage on the Q or I axis 202, 204 in each signal field rather than focusing the voltage in the signal field offset from the Q and I axes.

Figure 7:
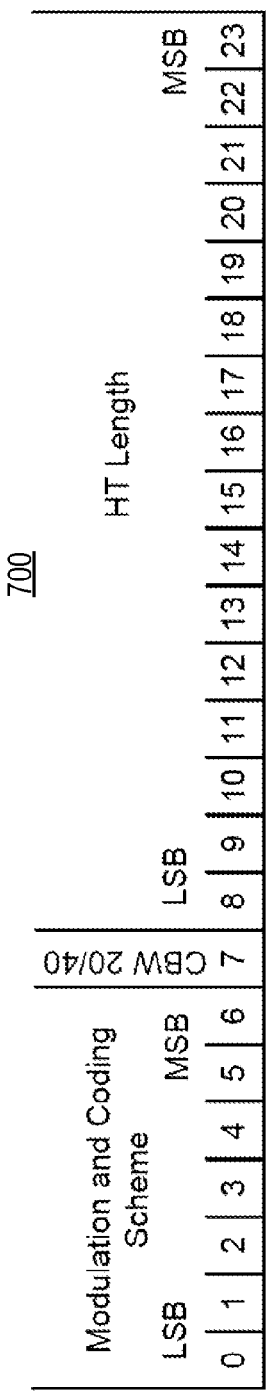
FIG. 7 illustrates the format of a high-throughput (HT) signal field 1 (HT-SIG 1) 700, according to example embodiments.
Figure 8:
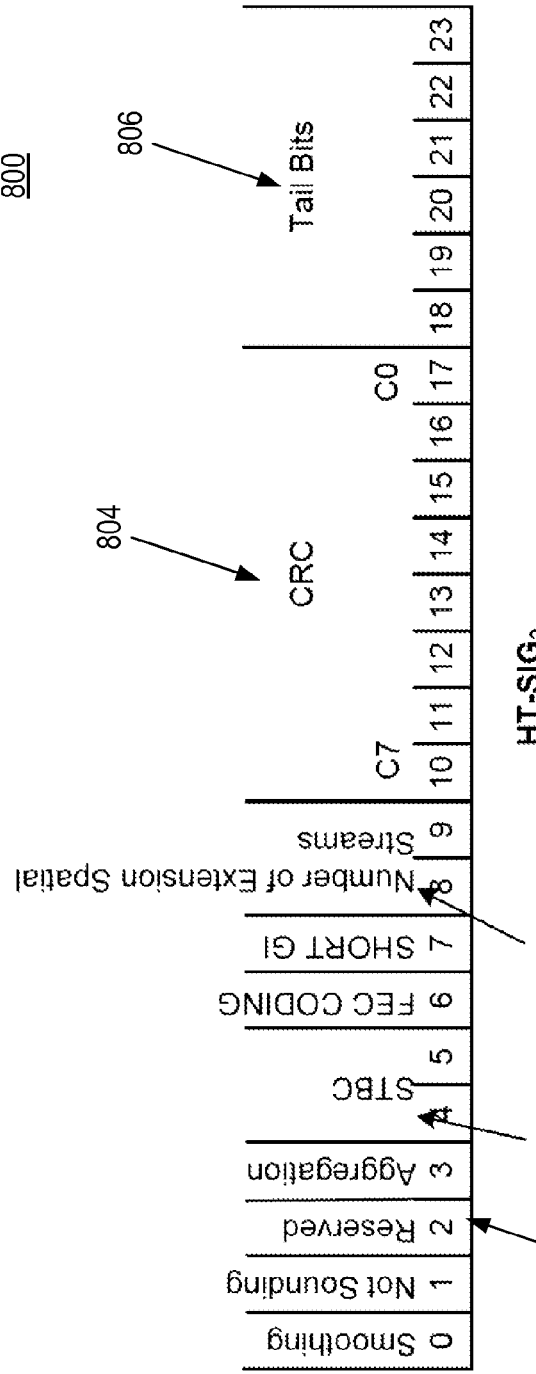
FIG. 8 illustrates the format of a HT-SIG 2, according to example embodiments.

FIG. 7 illustrates the format of a high-throughput (HT) signal field 1 (HT-SIG 1) 700, according to example embodiments. FIG. 8 illustrates the format of a HT-SIG 2 800, according to example embodiments. In example embodiments, the SIG constellation configuration of 802.11ax is the same as 802.11a, 802.11n, or 802.11ac. A reserved bit may be used to indicate that a SIG 700, 800 is for 802.11ax rather than 802.11a, 802.11n, 802.11ac, or another standard. For example, a reserved bit 802 may be flipped to a zero to indicate that the signal field 800 is a 802.11ax signal field rather than a 802.11n signal field. The fields may then be used for 802.11ax and interpreted by HEW device 104. Some fields may be used as they were with the legacy standard and other bits may be used in a different way for 802.11ax. For example, the CRC bits 804 and tail bits 806 may be used in their original places, and the other bits may be used according to a 802.11ax format.

In example embodiments, green field mode may be used in 802.11n and/or 802.11ac, in which case, the L-STF, L-LTF, and legacy signal field (L-SIG) of 802.11a are not transmitted. The legacy devices 106 of 802.11n and 802.11ac will not be able to decode the content of the decoded SIG field, but the legacy device 106 will be able to decode the length or duration field in the 802.11ax SIG and set their network allocation vector (NAV).

Figure 9:
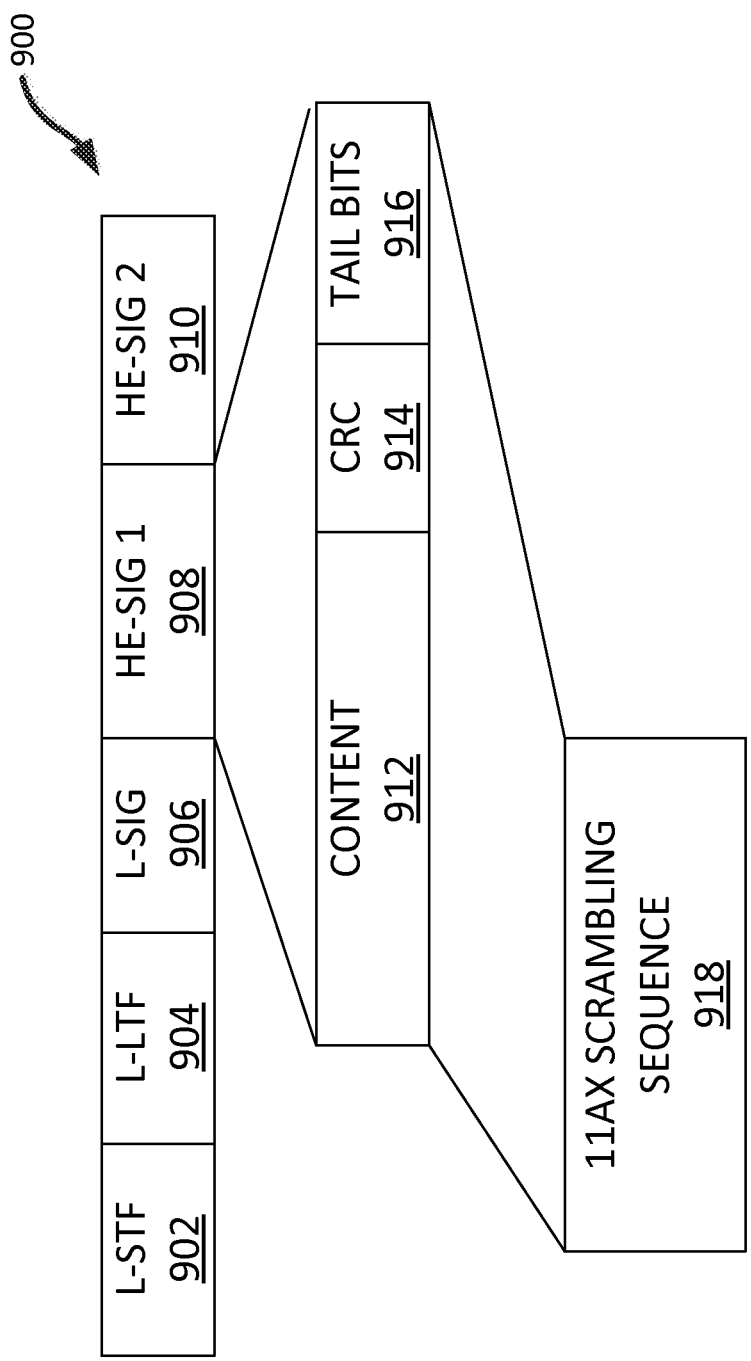
FIG. 9 illustrates a high-efficiency (HE) signal field (HE-SIG 1) where a portion of the HE-SIG 1 is scrambled to indicate that it is an HE-SIG 1.

FIG. 9 illustrates a high-efficiency (HE) signal field (HE-SIG 1) 908 where a portion of the HE-SIG 1 is scrambled to indicate that it is an HE-SIG 1 908. The legacy short training field (L-STF) 902 may be in accordance with a legacy standard of 802.11. The legacy long training field (L-LTF) 904 may be in accordance with a legacy standard of 802.11. The L-SIG 906 may be a binary phase shift keying (BPSK) packet that is formatted in accordance with 802.11a. The HE-SIG 1 908 may be N OFDM symbols long, which may be the same duration as a 802.11a SIG. The HE-SIG 1 908 may include content 912, cyclic redundancy code (CRC) 914 and tail bits 916. In example embodiments, the tail bits 916 are not included. The content 912 may be scrambled by a sending HEW device 104 using a 802.11ax scrambling sequence 918. The CRC 914 may be for the content 912. The tail bits 916 may be for flushing a convolutional encoder.

In example embodiments, the receiver STA, which may be a HEW device 104 or legacy device 106, decodes the first N symbols using legacy BPSK constellations after the L-SIG 906. N may be the number of OFDM symbols of an 802.11ax SIG. A HEW device 104 will unscramble the content 912 so that the CRC 914 will determine the content 912 matches the CRC 914 so that the HEW device 104 will identify the L-SIG 906 as part of a HEW packet. A legacy device 106 will not unscramble the content 912 and determine that the CRC 914 does not match the content 912 and may discard the packet. If the L-SIG 906 is correctly decoded, a legacy device 106 will still hold its transmission using the length field in the L-SIG 906.

The HEW devices 104 may be configured to use a scrambling sequence 918 that generates a high weight sequence by the channel encoder. For example, if the input of channel encoder is the scrambled sequence, then the output of the channel encoder should have many 1's. In example embodiments, a channel encoder such as binary convolution code (BCC) is applied to the L-SIG 906 bits. The HEW device 104 receiver tries to find a valid code word that minimizes the Euclidian distance between the received signal and the transmitted signal generated from the candidate code word. In example embodiments, by using a scrambling sequence 918 that generates a high weight, fewer false positive may occur. A false positive may be where the HEW device 104 receives a legacy frame, interference signal, or noise that appears to be a HE-SIG 1 908 when descrambled.

In example embodiments, one or more portions of the HE-SIG 1 908 may be scrambled. For example, the content 912, CRC 914, or tail bits 916. In example embodiments, only the CRC 914 bits are scrambled by the transmitter HEW device 104 (or AP 102) and then unscrambled by the receiver HEW device 104 (or AP 102).

In example embodiments, the code bits, which are the bits used to carry the information bits of the HE-SIG 1 908 are scrambled by the transmitter HEW device 104 and descrambled by the receiver HEW device 104. Scrambling the code bits may incur a higher complexity for unscrambling and detecting the 802.11ax SIG than scrambling the information bits of L-SIG 906.

An 802.11ax SIG may include HE-SIG 1 908 and HE-SIG 2 910. The HE-SIG 1 908 may be N OFDM symbols long, whose symbol duration may be the same symbol duration as 802.11a.

In some embodiments, the HE-SIG 1 908 field may be indicated by simply flipping a part of the SIG. For example, a 1 bit in the CRC 914 may be flipped to 0 at a predetermined position. This may maximize the signal distance in the information bit domain, but not the code bit domain or signal waveform domain. The reliability then may be lower than scrambling the CRC 914.

Figure 10:
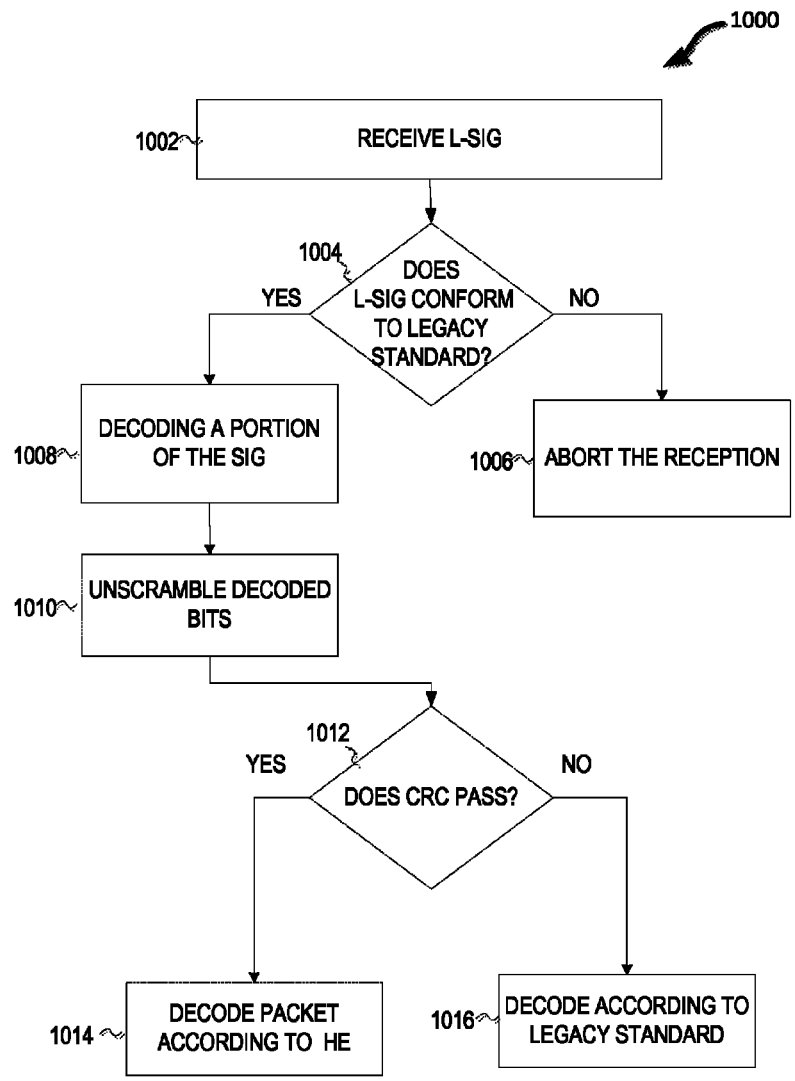
FIG. 10 illustrates a method to distinguish between a legacy signal field and a 802.11 HE signal field, according to example embodiments.

FIG. 10 illustrates a method 1000 to distinguish between a legacy signal field and a 802.11 HE signal field, according to example embodiments. The method 1000 may begin at operation 1002 with receiving a L-SIG. For example, a HEW device 104 may receive the L-SIG 906. The method 1000 may continue at operation 1004 by determining if the L-SIG 906 conforms to legacy standards. For example, the HEW device 104 may check to see if the L-SIG 906 specifies BPSK and passes CRC. If the L-SIG 906 does not conform to legacy standards, then the method 1000 may continue at operation 1006 by aborting the reception. For example, a HEW device 104 may abort the reception of an L-SIG 906 that does not conform to expected standards or that does not pass a CRC test.

Returning to operation 1004, if the L-SIG 906 does conform to legacy standards, the method 1000 continues with operation 1008, by decoding a portion of the SIG. For example, the HEW device 104 may decode the next N symbols of HE-SIG 1 908 using BPSK. The method 1000 may continue at operation 1010 by unscrambling the decoded bits. For example, continuing with the example above, the HEW device 104 may unscramble the N symbols of HE-SIG 1 908 that are decoded.

The method 1000 may continue at operation 1012 by checking whether CRC passes. For example, the HEW device 104 may perform a CRC check on the unscrambled N symbols of the HE-SIG 1 908. If the CRC passed, then the method 1000 continues at operation 1014 by decoding the packet according to HE. For example, the HEW device 104 may decode the remainder of the HE-SIG 1 908 according to 802.11ax standards. Returning to operation 1012, if the CRC does not pass, then the method 1000 may continue at operation 1016 by decoding according to legacy standards. For example, the HEW device 104 may determine that the HE-SIG 1 908 is actually a packet according to 802.11a and decode the packet using BPSK. The legacy standard may be, for example, 802.11a, 802.11n, or 802.11ac.

Figure 11:
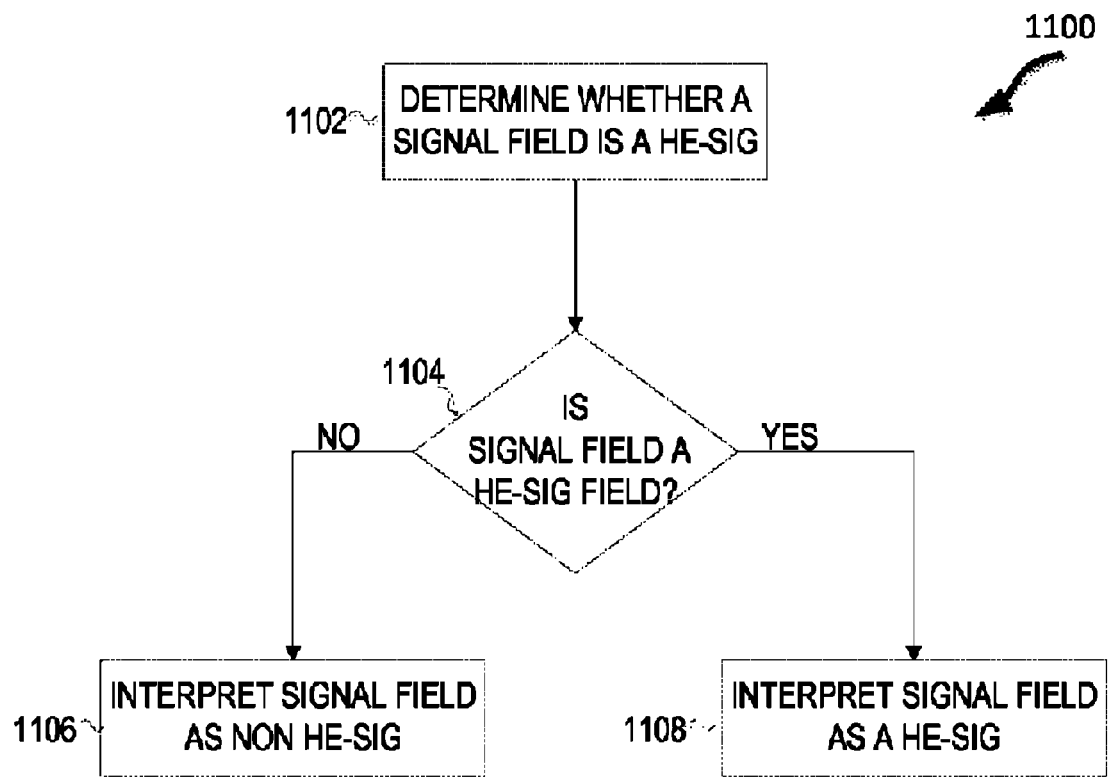
FIG. 11 illustrates a method for detecting HE-SIGs, according to example embodiments.

FIG. 11 illustrates a method 1100 for detecting HE-SIG 1 908s, according to example embodiments. The method 1100 may begin at operation 1102 by determining whether a signal field is a HE-SIG 1 908. For example, the HEW device 104 may be configured to detect the HE-SIG 1 908 based on one or more of a rotation of the signal constellation 200, 330, 360, 390, 430, 460, 490, 530, 560, 590 of the SIG as described in conjunction with FIGS. 2-6, a reserved bit 802 as described in conjunction with FIGS. 7 and 8, and a scrambled portion of the HE-SIG 1 908 as described in conjunction with FIGS. 9 and 10.

The method 1100 may continue at operation 1104 by determining if the signal field is a HE-SIG 1 908 field. If the signal field is determined to be a HE-SIG 1 908 field, then the method 1100 may continue at operation 1108 by interpreting the signal field as a HE-SIG 1 908 field. For example, the HEW device 104 may be configured to interpret the signal fields as HE-SIG 1 908 fields where the symbols may have four times the duration. If the signal field is determined not to be a HE-SIG 1 908 field, then the method 1100 continues at operation 1106 by interpreting the signal field as a non HE-SIG 1 908. For example, the HEW device 104 may interpret the signal field as an 802.11a, 802.11n, or 802.11ac signal field. Additionally, the HEW device 104 may interpret the signal field as belonging to a new standard or determine to discard the signal field.

Figure 12:
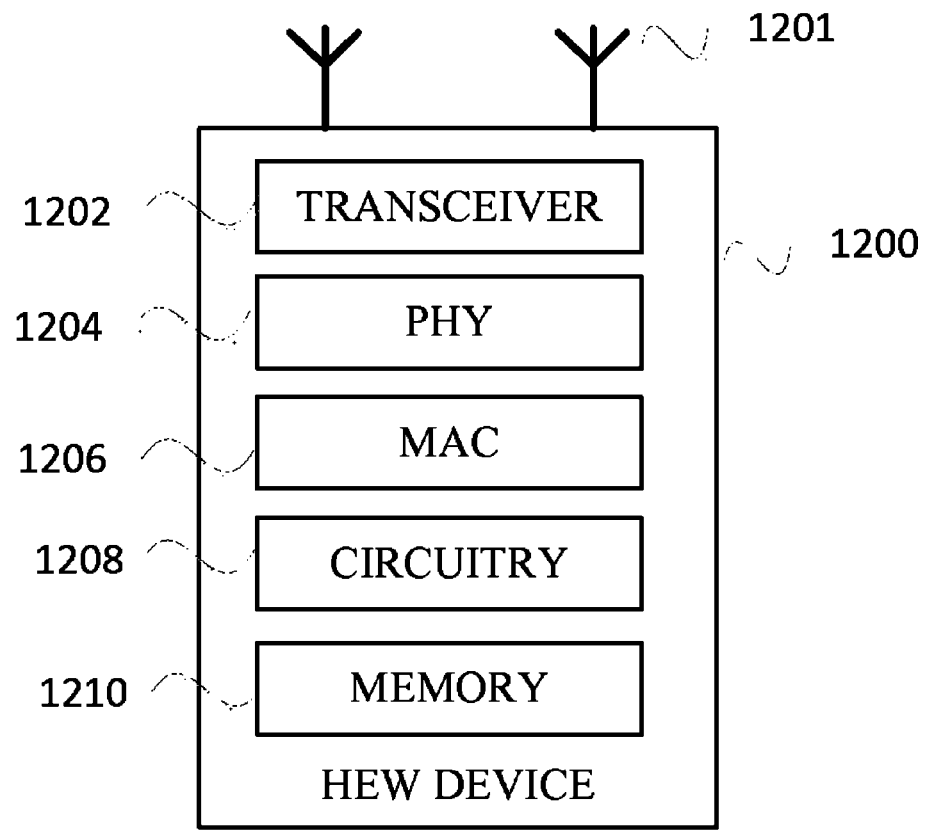
FIG. 12 illustrates a HEW device, in accordance with some embodiments.

FIG. 12 illustrates a HEW device, in accordance with some embodiments. HEW device 1200 may be an HEW compliant device that may be arranged to communicate with one or more other HEW devices, such as HEW devices 104 (FIG. 1), or AP 102 (FIG. 1), as well as communicate with legacy devices 106 (FIG. 1). HEW devices 104 and legacy devices 106 may also be referred to as HEW STAs and legacy STAs, respectively. HEW device 1200 may be suitable for operating as AP 102 (FIG. 1) or an HEW device 104 (FIG. 1). In accordance with embodiments, HEW device 1200 may include, among other things, a transmit/receive element (for example, an antenna) 1201, a transceiver 1202, PHY 1204 circuitry, and MAC 1206 circuitry. PHY 1204 and MAC 1206 may be HEW compliant layers and may also be compliant with one or more legacy IEEE 802.11 standards. MAC 1206 may be arranged to configure PHY 1204 layer convergence procedure (PLCP) protocol data units (PPDUs) and arranged to transmit and receive PPDUs, among other things. HEW device 1200 may also include other hardware processing circuitry 1208, and memory 1210 may be configured to perform the various operations described herein. The processing circuitry 1208 may be coupled to the transceiver 1202, which may be coupled to the transmit/receive element 1201. While FIG. 12 depicts the processing circuitry 1208 and the transceiver 1202 as separate components, the processing circuitry 1208 and the transceiver 1202 may be integrated together in an electronic package or chip.

In example embodiments, the HEW device 104 is configured to perform one or more of the functions and/or methods described herein, such as the methods, apparatuses, and functions described in conjunction with FIGS. 2 through 10 and, in particular, to detecting HE-SIG 1 908s. The PHY 1204 may include circuitry for modulation/demodulation, upconversion/downconversion, filtering, amplification, and the like. In some embodiments, the hardware processing circuitry 1208 may include one or more processors. The hardware processing circuitry 1208 may be configured to perform functions based on instructions being stored in a RAM or ROM, or based on special purpose circuitry. In some embodiments, the hardware processing circuitry 1208 may be configured to perform one or more of the functions described herein for sending and receiving schedules.

In some embodiments, two or more antennas may be coupled to the PHY 1204 and arranged for sending and receiving signals including transmission of the HEW packets. The HEW device 1200 may include a transceiver 1202 to transmit and receive data such as HEW PPDU and packets that include an indication that the HEW device 1200 should adapt the channel contention settings according to settings included in the packet. The memory 1210 may store information for configuring the other circuitry to perform operations for configuring and transmitting BAR and BA packets and performing the various operations described herein, including sending and responding to BARs and BAs.

In some embodiments, the HEW device 1200 may be configured to communicate using OFDM communication signals over a multicarrier communication channel. In some embodiments, HEW device 1200 may be configured to communicate in accordance with one or more specific communication standards, such as the IEEE standards including IEEE 802.11-2012, 802.11n-2009, 802.11ac-2013, 802.11ax, standards and/or proposed specifications for WLANs, although the scope of the example embodiments is not limited in this respect, as they may also be suitable to transmit and/or receive communications in accordance with other techniques and standards. In some embodiments, the HEW device 1200 may use 4× symbol duration of 802.11n or 802.11ac. For example, in some embodiments, the standard-duration OFDM symbols may have a symbol duration that ranges from 3.6 micro-seconds ($\mu s$) including a 400 nanosecond (ns) short guard interval to 4 $\mu s$ including an 800 ns guard interval. In some embodiments, the longer-duration OFDM symbols have a symbol duration that is 4× the duration of the standard-duration OFDM symbols.

In some embodiments, a HEW device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an AP 102, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be a liquid crystal display (LCD) screen including a touch screen.

The transmit/receive element 1201 may comprise one or more directional or omnidirectional antennas, including, for example, dipole antennas, monopole antennas, patch antennas, loop antennas, microstrip antennas or other types of antennas suitable for transmission of radio-frequency (RF) signals. In some MIMO embodiments, the antennas may be effectively separated to take advantage of spatial diversity and the different channel characteristics that may result.

Although the device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a station (STA) to detect a high-efficiency (HE) signal field (SIG). The STA may include circuitry configured to: detect the HE SIG based on at least one from the following group: a rotation of the signal constellation of the HE SIG different than a legacy SIG rotation, a flipped reserved bit, and a scrambled portion of the HE SIG.

In Example 2, the subject matter of Example 1 can optionally include where the circuitry is further configured to: determine whether a first sum of power of a first received signal field is greater for an in-phase (I) component than for a quadrature (Q) component; if the first sum of power of the first received signal field is greater for the I component, then determine that the first received signal field is not the HE signal field; determine whether a second sum of power of a second received signal field is greater for the I component than for the Q component; and if the second sum of power of the second received signal field is greater for the I component, then determine that the second received signal field has the rotation of the signal constellation of the HE SIG and is the HE SIG.

In Example 3, the subject matter of Example 3 can optionally include where the circuitry is further configured to interpret fields of the HE SIG as Institute of Electronic and Electrical Engineers (IEEE) 802.11ax SIG fields.

In Example 4, the subject matter of Example 2 can optionally include where the circuitry is further configured to determine that the second signal field is a Institute of Electronic and Electrical Engineers (IEEE) 802.11n signal field if the second sum of power of the second received signal field is less for the I component.

In Example 5, the subject matter of Example 2 can optionally include where the circuitry is further configured to determine that the SIG is a Institute of Electronic and Electrical Engineers (IEEE) 802.11a or IEEE 802.11ac SIG if the first sum of power of the first received signal field is greater for the I component.

In Example 6, the subject matter of any of Examples 1-5 can optionally include where the circuitry is further configured to determine that a second signal field is the HE-SIG, if a constellation of a first symbol is rotated 90 degrees and a second symbol is not rotated 90 degrees.

In Example 7, the subject matter of any of Examples 1-5 can optionally include where the circuitry is further configured to: determine that a reserved bit is the flipped reserved bit if the reserved bit indicates a value of 1 or 0 that is opposite of a value indicated by at least one of the following group: Institute of Electronic and Electrical Engineers (IEEE) 802.11a standard, IEEE 802.11ac standard, and IEEE 802.11n standard.

In Example 8, the subject matter of Example 7 can optionally include where the circuitry is further configured to interpret a first portion of the HE-SIG in accordance with one from the following group: IEEE 802.11a, 802.11ac, and 802.11n, and interpret a second portion of the HE-SIG in accordance with IEEE 802.11ax.

In Example 9, the subject matter of any of Examples 1-8 can optionally include where the circuitry is further configured to: unscramble a portion of a received signal field; determine whether a cyclic redundancy check (CRC) indicates the HE-SIG contains errors; and if the CRC indicates there are no errors, then determine that the signal field is the HE-SIG.

In Example 10, the subject matter of any of Examples 1-9 can optionally include where the portion of the HE-SIG is one from the following group: a content field, a CRC field, and a tail bits field.

In Example 11, the subject matter of any of Examples 1-10 can optionally include where the circuitry is further configured to operate in accordance with Institute of Electronics and Electrical Engineers (IEEE) 802.11ax.

In Example 12, the subject matter of any of Examples 1-11 can optionally include where the circuitry is further configured to transmit and receive in accordance with orthogonal frequency division multiple access (OFDMA), and further configured to transmit symbols with a duration that is four times the duration of the Institute of Electronics and Electrical Engineers (IEEE) 802.11a standard.

In Example 13, the subject matter of any of Examples 1-12 can optionally include memory and a transceiver coupled to the circuitry.

In Example 14, the subject matter of Example 13 can optionally include one or more antennas coupled to the transceiver.

Example 15 is a method performed by a station (STA). The method may include detecting a high-efficiency (HE) signal field (SIG) based on at least one from the following group: a rotation of the signal constellation of the SIG different than a legacy SIG rotation, a flipped reserved bit, and a scrambled portion of the HE-SIG.

In Example 16, the subject matter of Examples 15 can optionally include determining whether a first sum of power of a first received signal field is greater for an in-phase (I) component than for a quadrature (Q) component; determining that the signal field is not the HE signal field if the first sum of power of the first received signal field is greater for the I component; determining whether a second sum of power of a second received signal field is greater for the I component than for the Q component; and determining that the second signal field has the rotated SIG constellation and is the HE SIG, if the second sum of power of the second received signal field is greater for the I component.

In Example 17, the subject matter of Example 16 can optionally include determining that the second signal field is a Institute of Electronic and Electrical Engineers (IEEE) 802.11n signal field if the second sum of power of the second received signal field is less for the I component.

In Example 18, the subject matter of Examples 16 can optionally include determining that the SIG is a Institute of Electronic and Electrical Engineers (IEEE) 802.11a or IEEE 802.11ac SIG if the first sum of power of the first received signal field is greater for the I component.

In Example 19, the subject matter of any of Examples 15-18 can optionally include where the detecting the HE-SIG based on the rotation of the SIG constellation further includes determining that a second signal field is the HE-SIG, if a constellation of a first symbol is rotated 90 degrees and a second symbol is not rotated 90 degrees.

In Example 20, the subject matter of any of Examples 15-18 can optionally include determining that a reserved bit is the flipped reserved bit if the reserved bit indicates a value of 1 or 0 that is opposite of the value indicated by at least one of the following group: Institute of Electronic and Electrical Engineers (IEEE) 802.11a standard, IEEE 802.11ac standard, and IEEE 802.11n standard.

Example 21 is a high-efficiency wireless local-area network device (HEW) to detect a high-efficiency (HE) signal field (SIG). The HEW device may include circuitry configured to determine whether a first sum of power of a first received signal field is greater for an in-phase (I) component than for a quadrature (Q) component; if the first sum of power of the first received signal field is greater for the I component, then determine that the signal field is not the HE signal field; determine whether a second sum of power of a second received signal field is greater for the I component than for the Q component; and if the second sum of power of the second received signal field is greater for the I component, then determine that the second signal field has a rotated SIG constellation and is the HE SIG.

In Example 22, the subject matter of Example 21 can optionally include where the device is further configured to: determine that the second signal field is a Institute of Electronic and Electrical Engineers (IEEE) 802.11n signal field if the second sum of power of the second received signal field is less for the I component; and determine that the SIG is a Institute of Electronic and Electrical Engineers (IEEE) 802.11a or IEEE 802.11ac SIG if the first sum of power of the first received signal field is greater for the I component.

In Example 23, the subject matter of Example 22 can optionally include memory and a transceiver coupled to the circuitry.

Example 24 is a non-transitory computer-readable storage medium that stores instructions for execution by one or more processors to perform operations to detect a high-efficiency signal field (HE-SIG) by a wireless communication device. The instructions to configure the one or more processors to cause the wireless communication device to: detect a high-efficiency (HE) signal field (SIG) based on at least one from the following group: a rotation of the signal constellation of the SIG, a reserved bit, and a scrambled portion of the HE-SIG.

In Example 25, the subject matter of Example 24 can optionally include where the instructions further configure the one or more processors to cause the wireless communication device to: determine whether a first sum of power of a first received signal field is greater for an in-phase (I) component than for a quadrature (Q) component; determine that the signal field is not the HE signal field if the first sum of power of the first received signal field is greater for the I component; determine whether a second sum of power of a second received signal field is greater for the I component than for the Q component; and determine that the second signal field has the rotated SIG constellation and is the HE SIG, if the second sum of power of the second received signal field is greater for the I component.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and, circuitry coupled to the memory, the circuitry configured to:
    detect a high-efficiency (HE) signal field (SIG) of a preamble of a packet based on
    a rotation of a signal constellation of the HE SIG different than legacy rotations of: a rotation of a first signal constellation and no rotation of a second signal constellation, and no rotation of the first signal constellation and a rotation of the second signal constellation;
    determine whether a first sum of power of a first received signal field is greater for an in-phase (I) component than for a quadrature (Q) component;
    if the first sum of power of the first received signal field is greater for the I component, then determine that the first received signal field is not the HE signal field;
    determine whether a second sum of power of a second received signal field is greater for the I component than for the Q component;
    if the second sum of power of the second received signal field is greater for the I component, then determine that the second received signal field has the rotation of the signal constellation of the HE SIG and is the HE SIG;
    if the HE SIG is detected, configure the STA to process remaining portions of the packet following the HE SIG in accordance with a HE format; and
    if the HE SIG is not detected, configure the STA to process the remaining portions of the packet following the HE SIG in accordance with a legacy format.

2. The apparatus of claim 1, wherein the circuitry is further configured to interpret fields of the HE SIG as Institute of Electronic and Electrical Engineers (IEEE) 802.11ax SIG fields.

3. The apparatus of claim 1, wherein the circuitry is further configured to determine that the second signal field is a Institute of Electronic and Electrical Engineers (IEEE) 802.11n signal field if the second sum of power of the second received signal field is less for the I component.

4. The apparatus of claim 1, wherein the circuitry is further configured to determine that the SIG is a Institute of Electronic and Electrical Engineers (IEEE) 802.11a or IEEE 802.11ac SIG if the first sum of power of the first received signal field is greater for the I component.

5. The apparatus of claim 1, wherein the circuitry is further configured to determine that a second signal field is the HE-SIG, if a constellation of a first symbol is rotated 90 degrees and a second symbol is not rotated 90 degrees.

6. The apparatus of claim 1, wherein the circuitry is further configured to:
    determine that a reserved bit is the flipped reserved bit if the reserved bit indicates a value of 1 or 0 that is opposite of a value indicated by at least one of the following group:
    Institute of Electronic and Electrical Engineers (IEEE) 802.11a standard, IEEE 802.11ac standard, and IEEE 802.11n standard.

7. The apparatus of claim 6, wherein the circuitry is further configured to interpret a first portion of the HE-SIG in accordance with one from the following group:
    IEEE 802.11a, 802.11ac, and 802.11n, and interpret a second portion of the HE-SIG in accordance with IEEE 802.11ax.

8. The apparatus of claim 1, wherein the circuitry is further configured to operate in accordance with Institute of Electronics and Electrical Engineers (IEEE) 802.11ax.

9. The apparatus of claim 1, wherein the circuitry is further configured to transmit and receive in accordance with orthogonal frequency division multiple access (OFDMA), and further configured to transmit symbols with a duration that is four times the duration of the Institute of Electronics and Electrical Engineers (IEEE) 802.11a standard.

10. The apparatus of claim 1, further comprising memory and a transceiver coupled to the circuitry.

11. The apparatus of claim 10, further comprising one or more antennas coupled to the transceiver.

12. A method performed by an apparatus of a station (STA), the method comprising:
   detecting a high-efficiency (HE) signal field (SIG) from a preamble of a packet based on
      a scrambled portion of the HE SIG
      if the HE SIG is detected, configure the STA to process remaining portions of the packet following the HE SIG in accordance with a HE format; and
      if the HE SIG is not detected, configure the STA to process the remaining portions of the packet following the HE SIG in accordance with a legacy format.

13. The method of claim 12, further comprising:
   determining that the second signal field is a Institute of Electronic and Electrical Engineers (IEEE) 802.11n signal field if the second sum of power of the second received signal field is less for the I component.

14. The method of claim 12, further comprising:
   determining that the SIG is a Institute of Electronic and Electrical Engineers (IEEE) 802.11a or IEEE 802.11ac SIG if the first sum of power of the first received signal field is greater for the I component.

15. The method of claim 12, wherein the detecting the HE-SIG based on the rotation of the SIG constellation further comprises:
   determining that a second signal field is the HE-SIG, if a constellation of a first symbol is rotated 90 degrees and a second symbol is not rotated 90 degrees.

16. The method of claim 12, the method further comprising:
   unscrambling a portion of a received signal field;
   determining whether a cyclic redundancy check (CRC) indicates the HE-SIG contains errors; and
   if the CRC indicates there are no errors, then determining that the signal field is the HE-SIG.

17. The method of claim 12, wherein the portion of the HE-SIG is one from the following group: a content field, a CRC field, and a tail bits field.

18. An apparatus of a high-efficiency (HE) wireless device, the apparatus comprising: memory; and circuitry coupled to the memory, the circuitry configured to:
   determine whether a first sum of power of a first received signal field is greater for an in-phase (I) component than for a quadrature (Q) component;
   if the first sum of power of the first received signal field is greater for the I component, then determine that the signal field is not the HE signal field;
   determine whether a second sum of power of a second received signal field is greater for the I component than for the Q component; and
   if the second sum of power of the second received signal field is greater for the I component, then determine that the second signal field has a rotated SIG constellation and is a high-efficiency (HE) signal field (SIG);
   if the HE SIG is detected, configure the STA to process remaining portions of the packet following the HE SIG in accordance with a HE format and
   if the HE SIG is not detected, configure the STA to process the remaining portions of the packet following the HE SIG in accordance with a legacy format.

19. The apparatus of claim 18, wherein the device is further configured to:
   determine that the second signal field is a Institute of Electronic and Electrical Engineers (IEEE) 802.11n signal field if the second sum of power of the second received signal field is less for the I component; and
   determine that the SIG is a Institute of Electronic and Electrical Engineers (IEEE) 802.11a or IEEE 802.11ac SIG if the first sum of power of the first received signal field is greater for the I component.

20. The apparatus of claim 18, further comprising a transceiver coupled to the circuitry.

21. A non-transitory computer-readable storage medium that stores instructions for execution by one or more processors to perform operations by an apparatus of a wireless communication device, the instructions to configure the one or more processors to cause the apparatus to:
   detect a high-efficiency (HE) signal field (SIG) from a preamble of a packet based on
   a rotation of a signal constellation of the HE SIG different than legacy rotations of: a rotation of a first signal constellation and no rotation of a second signal constellation, and no rotation of the first signal constellation and a rotation of the second signal constellation;
   determine whether a first sum of power of a first received signal field is greater for an in-phase (I) component than for a quadrature (Q) component;
   if the first sum of power of the first received signal field is greater for the I component, then determine that the first received signal field is not the HE signal field;
   determine whether a second sum of power of a second received signal field is greater for the I component than for the Q component;
   if the second sum of power of the second received signal field is greater for the I component, then determine that the second received signal field has the rotation of the signal constellation of the HE SIG and is the HE SIG;
   if the HE SIG is detected, configure the STA to process remaining portions of the packet following the HE SIG in accordance with a HE format; and
   if the HE SIG is not detected, configure the STA to process the remaining portions of the packet following the HE SIG in accordance with a legacy format.

* * * * *